US008891742B2

(12) United States Patent
Gao et al.

(10) Patent No.: US 8,891,742 B2
(45) Date of Patent: *Nov. 18, 2014

(54) IP HANDSET-BASED VOICE MAIL NOTIFICATION

(71) Applicant: AT&T Intellectual Property I, L.P., Atlanta, GA (US)

(72) Inventors: Xiaofeng Gao, Alpharetta, GA (US); David A. Scott, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,367

(22) Filed: Apr. 28, 2014

(65) Prior Publication Data

US 2014/0233434 A1   Aug. 21, 2014

Related U.S. Application Data

(60) Continuation of application No. 12/169,989, filed on Jul. 9, 2008, now Pat. No. 8,737,577, which is a division of application No. 11/029,565, filed on Jan. 5, 2005, now Pat. No. 7,400,713, which is a division of application No. 10/223,407, filed on Aug. 20, 2002, now Pat. No. 6,891,934.

(51) Int. Cl.
*H04M 1/64* (2006.01)
*H04W 4/14* (2009.01)
*H04M 3/533* (2006.01)

(52) U.S. Cl.
CPC ............ *H04M 3/53325* (2013.01); *H04W 4/14* (2013.01)
USPC ........................................ 379/88.17; 370/352

(58) Field of Classification Search
None
See application file for complete search history.

(56) References Cited

U.S. PATENT DOCUMENTS

| | | | |
|---|---|---|---|
| 4,625,081 A * | 11/1986 | Lotito et al. | 379/88.26 |
| 4,713,835 A | 12/1987 | Bond et al. | 379/79 |
| 5,568,540 A | 10/1996 | Greco et al. | 379/88.25 |
| 5,678,179 A | 10/1997 | Turcotte et al. | 455/466 |
| 5,826,026 A | 10/1998 | Friedman | 709/217 |
| 5,838,768 A | 11/1998 | Sumar et al. | 379/88.14 |
| 5,987,100 A | 11/1999 | Fortman et al. | |
| 6,052,422 A | 4/2000 | Lin | 375/355 |
| 6,052,442 A | 4/2000 | Cooper et al. | |
| 6,215,859 B1 | 4/2001 | Hanson | 379/88.22 |
| 6,259,449 B1 * | 7/2001 | Saxena et al. | 715/853 |
| 6,404,764 B1 | 6/2002 | Jones et al. | |
| 6,434,143 B1 | 8/2002 | Donovan | |
| 6,442,243 B1 * | 8/2002 | Valco et al. | 379/67.1 |
| 6,446,112 B1 | 9/2002 | Bunney et al. | |

(Continued)

*Primary Examiner* — Duc Nguyen
*Assistant Examiner* — Assad Mohammed
(74) *Attorney, Agent, or Firm* — Myers Bigel Sibley & Sajovec, PA

(57) ABSTRACT

A system and method that notifies the receipt of a voicemail message at an IP telephone using one or more of instant messaging and short message service. A preferred embodiment of the invention provides an IP telephone that prepares a notification regarding the receipt of a voicemail message. In one embodiment, the IP telephone queries the availability of an instant messaging client via an instant messaging presence server, and forwards the notification to the instant messaging presence server if the instant messaging client is available. In another embodiment, the IP telephone sends the notification to a short message service client via a short message service gateway. In still another embodiment, the IP telephone sends the notification to both instant messaging client and short message service clients.

2 Claims, 4 Drawing Sheets

(56) References Cited

U.S. PATENT DOCUMENTS

| | | |
|---|---|---|
| 6,446,118 B1 | 9/2002 | Gottlieb |
| 6,483,898 B2 | 11/2002 | Lew et al. |
| 6,493,745 B1 | 12/2002 | Cherian |
| 6,496,851 B1 | 12/2002 | Morris et al. |
| 6,560,318 B1 | 5/2003 | Spielman et al. |
| 6,628,644 B1 | 9/2003 | Nelson et al. |
| 6,691,162 B1 | 2/2004 | Wick |
| 6,788,667 B1 | 9/2004 | Beresin ............ 370/338 |
| 6,795,534 B2 | 9/2004 | Noguchi |
| 6,871,214 B2 * | 3/2005 | Parsons et al. ............ 709/206 |
| 6,879,677 B2 | 4/2005 | Trandal et al. |
| 6,940,955 B1 * | 9/2005 | Jones et al. ............ 379/88.23 |
| 6,981,223 B2 | 12/2005 | Becker et al. ............ 715/753 |
| 7,009,961 B2 | 3/2006 | Pietrowicz et al. |
| 7,269,162 B1 | 9/2007 | Turner ............ 370/352 |
| 7,539,747 B2 | 5/2009 | Lucovsky et al. ............ 709/224 |
| 2002/0077082 A1 | 6/2002 | Cruickshank |
| 2002/0085539 A1 | 7/2002 | Hyun |
| 2003/0131143 A1 | 7/2003 | Myers |
| 2005/0239550 A1 | 10/2005 | Hardisty et al. |

\* cited by examiner

IP HANDSET-BASED VOICE MAIL NOTIFICATION

RELATED APPLICATIONS

The present application is a continuation of and claims priority from U.S. application Ser. No. 12/169,989, filed Jul. 9, 2008, entitled "IP Handset-Based Voice Mail Notification," which is a divisional of and claims priority from U.S. application Ser. No. 11/029,565,filed Jan. 5, 2005, entitled "IF Handset-Based Voice Mail Notification," now U.S. Pat. No. 7,400,713, which is a divisional of and claims priority from U.S. application Ser. No. 10/223,407,filed Aug. 20, 2002, entitled "IP Handset-Based Voice Mail Notification," now U.S. Pat. No. 6,891,934, the disclosures of both of which are incorporated herein as if set forth fully.

FIELD OF THE INVENTION

The present invention relates generally to the field of voicemail management and, more particularly, to systems and methods for announcing arrival of voicemails received by an Internet protocol (IP) telephone using instant messaging (IM) and short message service (SMS).

BACKGROUND OF THE INVENTION

Internet protocol (IP) based telephones are gaining popularity. Currently, users can initiate a telephone call using an IP telephone. Similarly, the IP telephone also allows users to receive telephone calls. IP telephones include, for example, Session Initiation Protocol (SIP) telephones. Like some conventional telephones, IP telephones can be equipped to record voicemail messages from callers when the users of the IP telephones are unavailable to answer calls.

As known in the art, voicemails can be retrieved by the users in a number of ways. For example, using a telephone set in her office, a voicemail user who returns from a lunch break can hear voicemails that were left at her voice mailbox while she was at lunch. Alternatively, the voicemail user could also remotely dial in (e.g., from her home or while she is out of town) to her voice mailbox to retrieve the voice messages. Regardless of the method used, the voicemail user must first access her IP telephone to determine whether or not a new message has been stored in her voice mailbox since the last time she checked the mailbox. This can be inconvenient to the user. For example, a user who attends a seminar must periodically leave the meeting hall to dial in to her voice mailbox to find out whether an important message has been left in her voice mailbox.

Accordingly, there is a need for a system and method that would notify the user instantaneously when a voicemail has arrived at her voice mailbox.

SUMMARY OF THE INVENTION

The present invention is a system and method that provides notification of voicemail messages received by an IP telephone. In a preferred embodiment, the invention provides a system that includes an IP telephone that is adapted to send the notification to one or both of an instant messaging client and a short message service client.

In an embodiment in which the notification is configured to be sent to an instant messaging client, when a new message for a user of the IP telephone is received, the IP telephone queries an instant messaging presence server to determine whether the instant messaging client is available. If the instant messaging client is available, the IP telephone sends the notification to the instant messaging presence server, which in turns forwards the notification to the instant messaging client. "Available" means the instant messaging client is online, engaged in an instant messaging session, or otherwise logged on to the instant messaging presence server. The IP telephone queues the notification for a later delivery if the instant messaging client is not available. In another embodiment in which the notification is configured to be sent to a short message service client, the notification generator sends the notification to the short message service client upon receipt of a new voicemail message. In still another embodiment, the IP telephone is capable of sending notifications to both the instant messaging client and the short message service client. Such notifications can be done either seriatim or simultaneously. The IP telephone preferably uses the Session Initiation Protocol.

In another preferred embodiment, the invention provides a method for notifying one or more of an instant messaging client and a short message service client ("clients") of voicemail messages received by a IP telephone. The method includes the following steps. First, the IP telephone receives a voicemail message intended for the user of the IP telephone. Receipt of the voicemail message can mean receiving a voicemail message previously recorded elsewhere. Receipt of the voicemail message can also mean recording the voicemail message at the IP telephone. Then, the IP telephone prepares a notification, The notification indicates that a new message is available on the IP telephone for retrieval. The notification may include various attributes of the voicemail message, For example, the attributes can include an identity of a sender of the message, the date and time of the message, the size of the message or other useful information. If one of the clients is an instant messaging client, the IP telephone queries an instant messaging presence server whether the instant messaging client is available. If the instant messaging client is available, the IP telephone sends the notification to the instant messaging presence server, which in turns forwards the notification to the instant messaging client using known instant messaging technologies. If one of the clients is a short message service client, the IP telephone sends the notification to the short message service client via a short message service gateway.

DETAILED DESCRIPTION OF THE INVENTION

Figure 1:
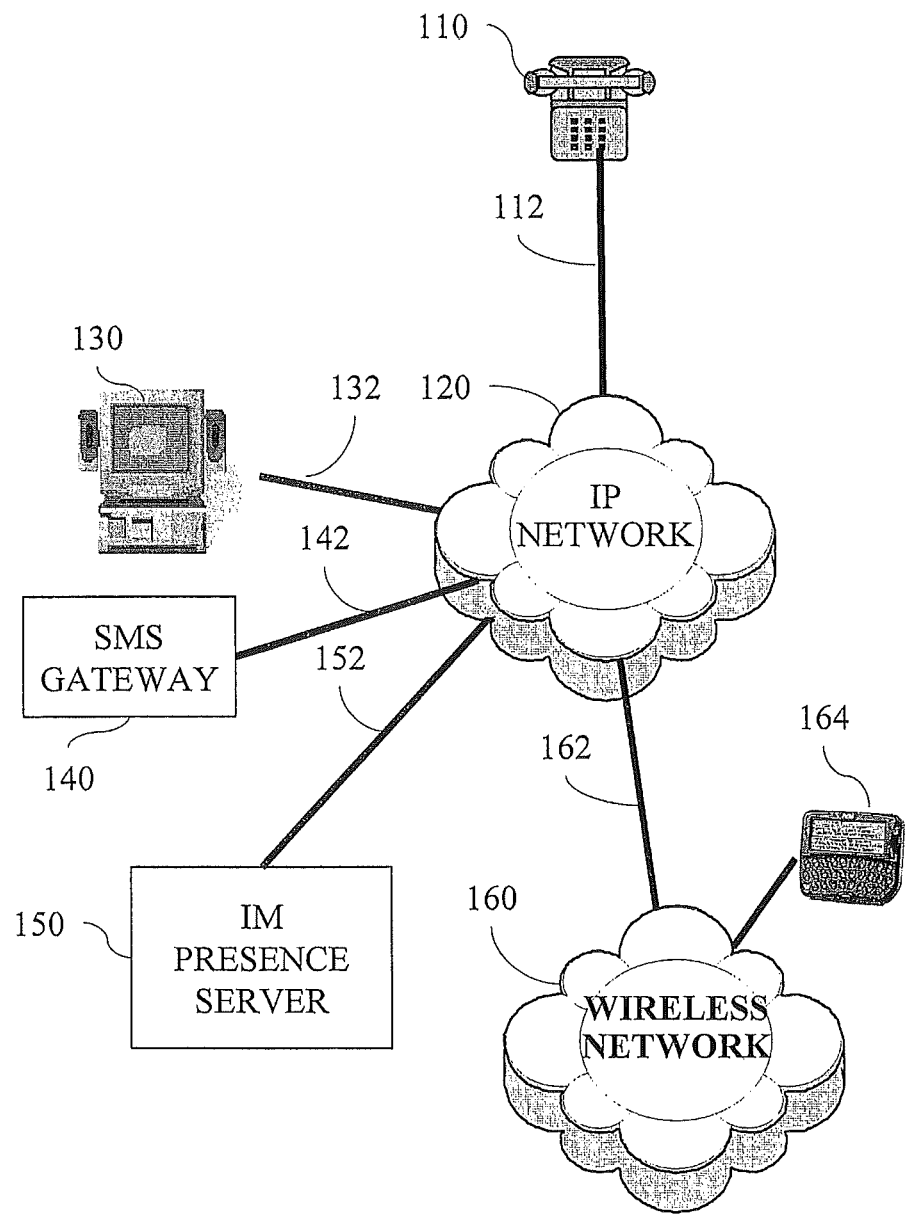
FIG. 1 is a schematic diagram showing the system architecture used in a preferred embodiment of the invention.

FIG. 1 is a schematic diagram showing the system architecture used in a preferred embodiment of the invention. IP telephone 110, IP network 120, short message service (SMS) gateway 140, instant messaging (IM) presence server 150, and wireless network 160 are well known in the art. Callers can leave voicemail messages at IP telephone 110. The voicemail messages may be recorded at IP telephone 110. In some instances, IP telephone 110 can receive voicemail messages previously recorded elsewhere. Wireless device 164 is a member of wireless network 160. Wireless device 164 can be, for example, a wireless telephone, an interactive pager, a personal digital assistant, a Pocket PC, or the like. Wireless device 164 is adapted to receive short message service messages through short message service gateway 140. Instant messaging client 130 is adapted to receive instant messages via instant messaging presence server 150. Instant messaging client 130, as known in the art, can be a desktop computer, a laptop computer, or the like.

As known in the art, IP telephone 110 can receive voicemail from various callers. IP telephone 110 is in communication with IP network 120 via link 112. IP telephone 110 and IP network 120 can communicate with each other using known protocols, including, for example, TCP/IP.

Figure 2:
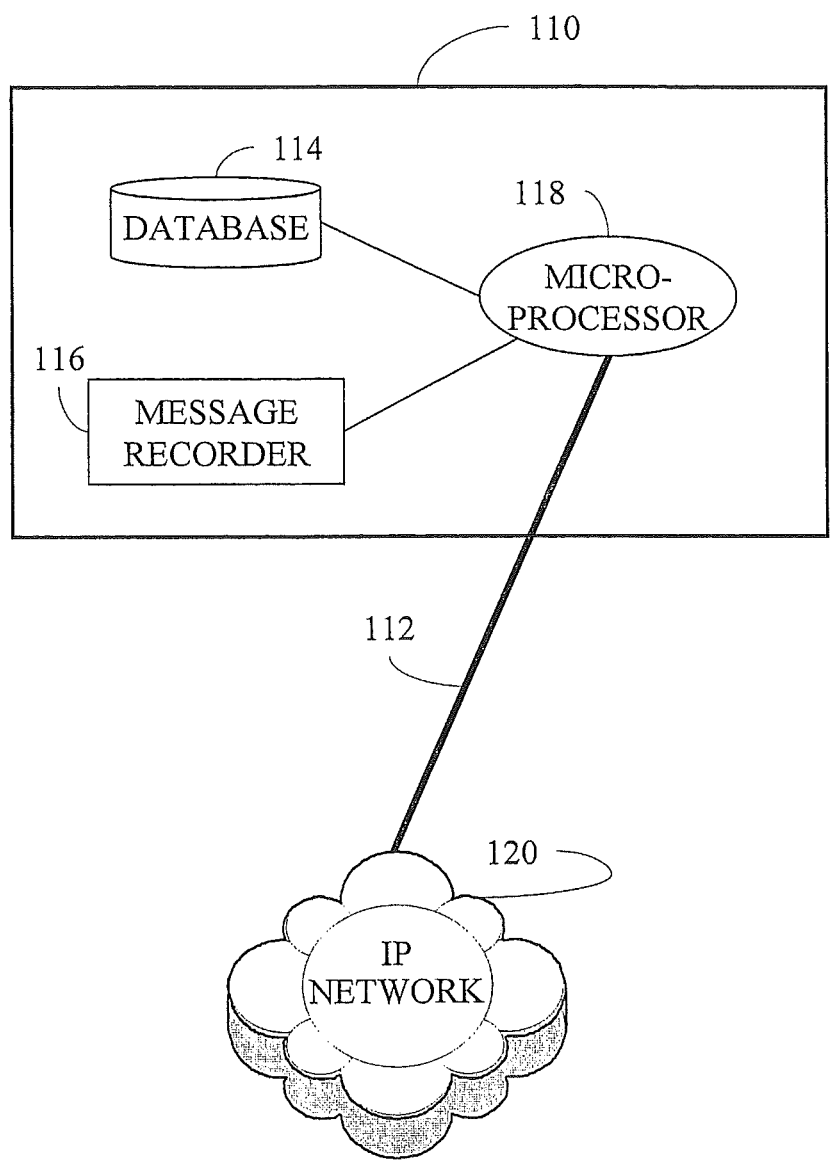
FIG. 2 is a schematic diagram showing various components of an IP telephone of the invention.

FIG. 2 is a schematic diagram showing various Components of an IP telephone of the invention. IP telephone 110 includes database 114, message recorder 116 and microprocessor 118. Microprocessor 118 is in communication with each of database 114 and message recorder 116. Microprocessor 118 is adapted to retrieve information from database 114. Information retrievable from database 114 includes, for example, voicemail notification preferences set by a user of IP telephone 110 regarding how a notification should be prepared and sent. Message recorder 116 is an apparatus that can digitally store voicemail messages spoken by callers. Microprocessor 118 can prepare a notification to include sender identity, date and time, a size of a voicemail message and other attributes of the voicemail message. As indicated in FIG. 2, microprocessor 118 is adapted to communicate with IP network 120.

Preferably, IP telephone 110 is adapted to provide traditional voicemail features as well as new features. Preferably, IP telephone 110 is adapted to send the notification via IP network 120. As known in the art, there are a number of different protocols used by different instant messaging service providers. For example, each of AOL, Yahoo!, and MSN uses its own protocol for its instant messaging service. Accordingly, communications sessions between IP telephone 110 and instant messaging presence server 150 can be facilitated by the appropriate protocol associated with instant messaging presence server 150.

Preferably, IP telephone 110 is adapted to provide a number of functionalities. For example, in a preferred embodiment of the invention, IP telephone 110 can query instant messaging presence server 150 for information about whether instant messaging client 130 has an active instant messaging session. "Available" means the instant messaging client is online, engaged in an instant messaging session, or otherwise logged on to the instant messaging presence server. If instant messaging client 130 is available, IP telephone 110 sends the notification to instant messaging client 130. The notification is preferably forwarded via IP network 120 and instant messaging presence server 150 through links 152 and 132.

Figure 3:
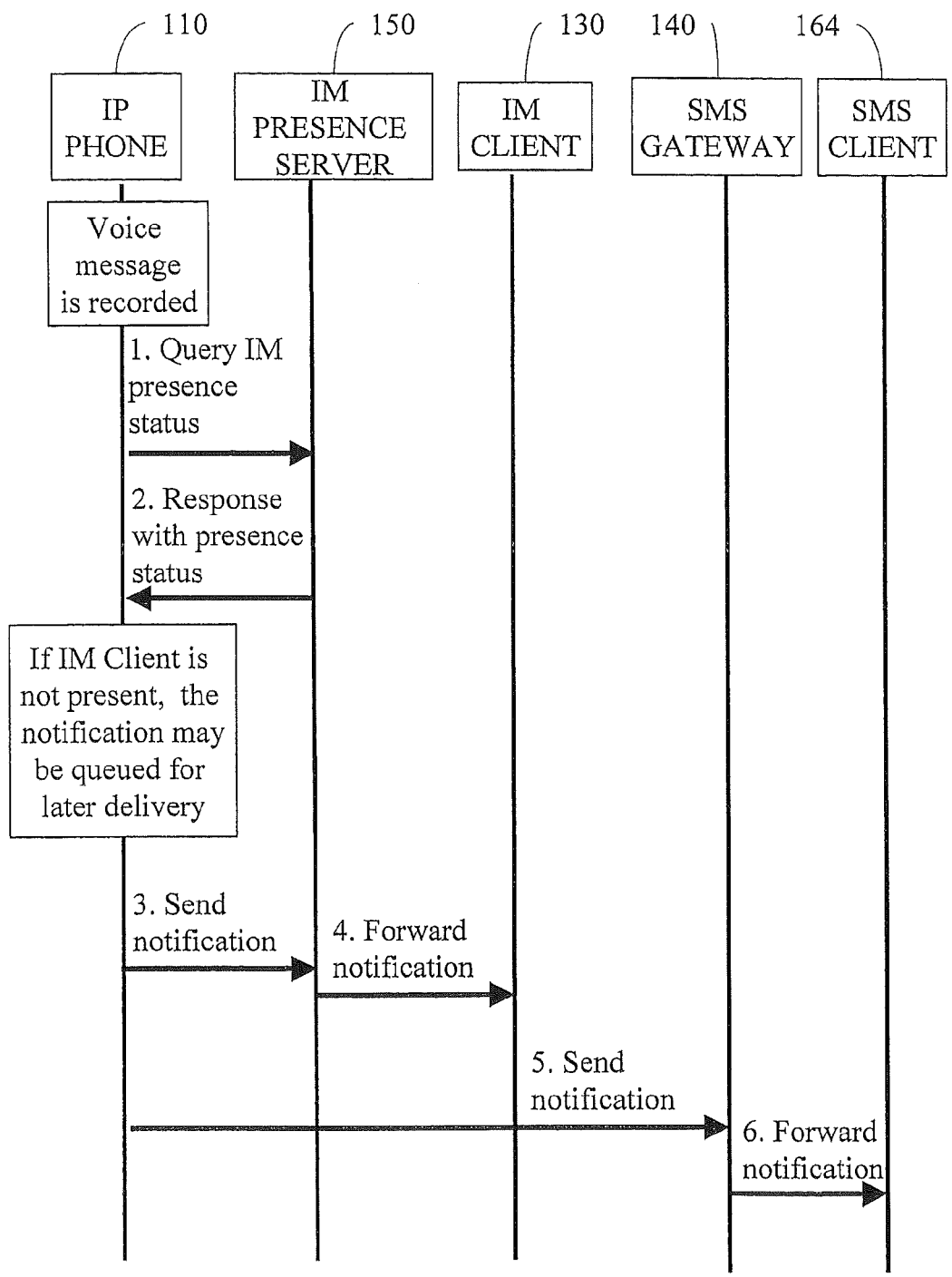
FIG. 3 is a schematic diagram summarizing the sequence of activities involving an IP telephone, an instant messaging presence server, an instant messaging client, a short message service gateway, and a short message service client.

FIG. 3 is a schematic diagram summarizing the sequence of communications and other actions between IP telephone 110, instant messaging presence server 150, instant messaging client 130, short message service gateway 140, and short message service client 164. As shown in FIG. 3, communications between IP telephone 110 and instant messaging presence server 150 are two-way sessions, which can include multiple queries and responses.

Figure 4:
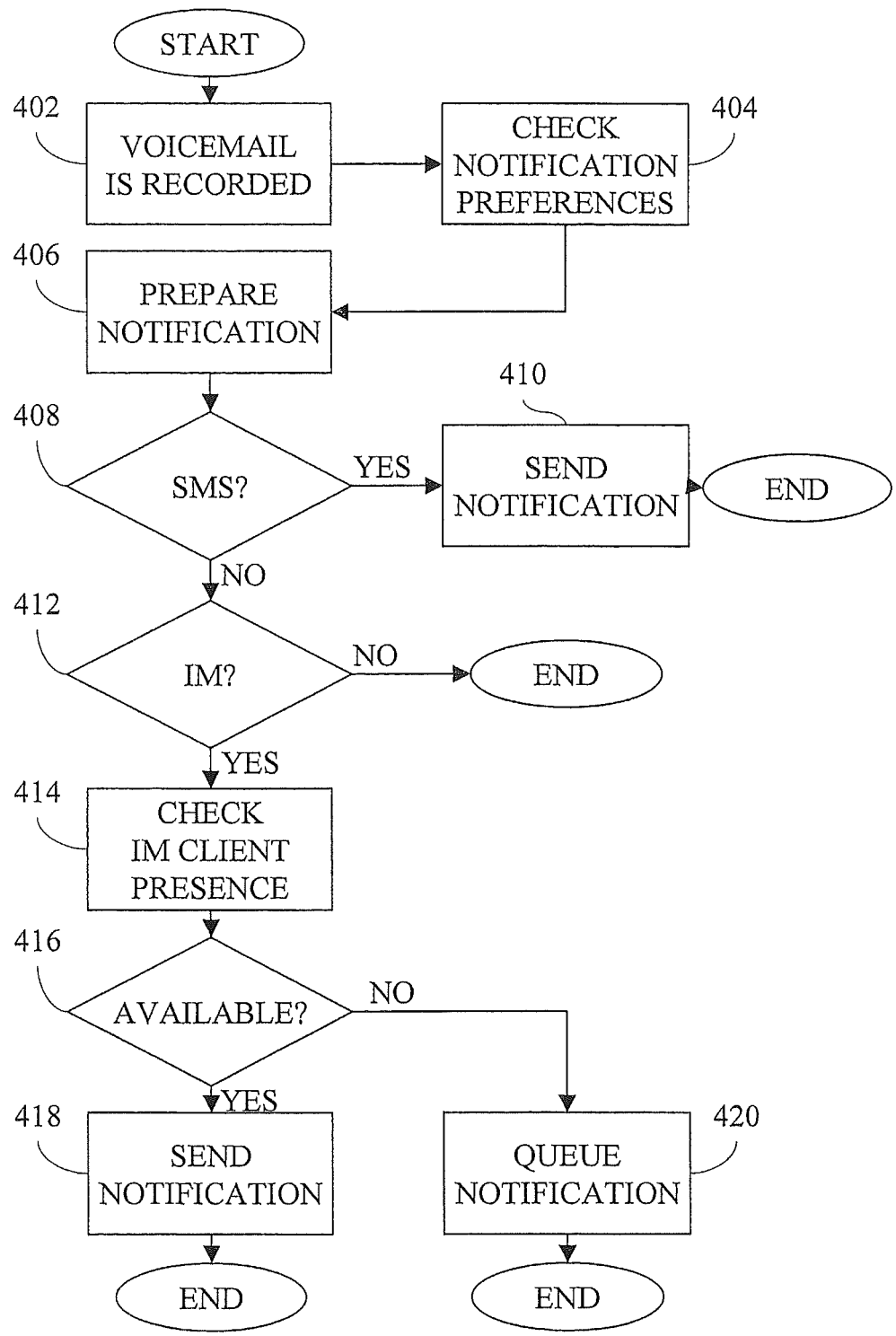
FIG. 4 is a flowchart showing exemplary steps involved in implementing a preferred embodiment of the invention.

FIG. 4 is a flowchart showing exemplary steps involved in implementing a preferred embodiment of the invention.

In step 402, a voicemail message is received by IP telephone 110. Here, the voicemail message can be recorded by message recorder 116. Alternatively, a voicemail message recorded elsewhere can be forwarded to IP telephone 110. Optionally, IP telephone 110 may ask the caller to mark the message as "urgent", "private", "immediate delivery" or "delayed delivery".

In step 404, IP telephone 110 reviews voicemail notification preferences previously set by a user of IP telephone 110. The preferences can include, for example, rules regarding whether a notification should be sent at all, and if so, where, how, or when the notification should be sent. One exemplary rule may instruct IP telephone 110 to send a notification to one or both instant messaging client 130 and short message service client 164. Another exemplary rule may instruct IP telephone to send a notification only if the voicemail is left by a specific person. Still another exemplary rule may be based on when the voicemail is recorded.

In step 406, IP telephone 110 prepares a notification. The notification can include one or more attributes. The attribute can include one or more of an identity of the caller, the date and/or time the voicemail was recorded, and a size of the voicemail message. The identity can be, for example, a telephone number or a name associated with the caller. In this step, review of information available in database 114 and/or obtained from Caller ID type services may be involved.

In step 408, if it is determined that there is a rule requiring IP telephone 110 to send the notification to short message service client 164, the process goes to step 410. Otherwise, the process goes to step 412.

In step 410, IP telephone 110 sends the notification to short message service client 164. Preferably, the notification is sent via short message service gateway 140.

In step 412, if it is determined that there is a rule requiring IP telephone 110 to send the notification to instant messaging client 130, the process goes to step 414. Otherwise, the process ends.

In step 414, IP telephone 110 determines whether instant messaging client 130 is available to receive the notification by checking the presence of instant messaging client 130. The determination can be done, for example, by querying instant messaging presence 150 via IP network 120. Such querying is well known in the art.

In step 416, if it is determined that instant messaging client 130 is present or available, the process goes to step 418; otherwise, the process goes to step 420.

In step 418, the notification is sent from IP telephone 110 to instant messaging client 130. Preferably, the notification is sent via instant messaging presence server 150.

In step 420, the notification is queued for a later delivery until instant messaging client 130 is available.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing voicemail notification comprising:
   storing a set of voicemail notification preferences on an internet protocol telephone;
   recording a voicemail message at the internet protocol telephone;
   generating a prompt at the internet protocol telephone for a caller to select a characteristic of the message from a list of characteristics comprising urgent, private, immediate delivery, and delayed delivery;
   receiving input from the caller comprising a selection of the characteristic of the message from the list of characteristics comprising urgent, private, immediate delivery, and delayed delivery; and
   preparing a notification on the internet protocol telephone that the message has been received, the notification comprising a size of the message, a time the message was received, an identification of a source of the message, and the characteristic of the message; and
   transmitting the notification based on the voicemail notification preferences;
   wherein the voicemail notification preferences indicate where to transmit the notification; and
   wherein the voicemail notification preferences indicate how to transmit the notification.

2. The method of claim 1, wherein the voicemail notification preferences indicate when to transmit the notification.

* * * * *